/16/88 /350 XR 4,725,129

United States Patent [19]

Kondo et al.

[11] Patent Number: 4,725,129

[45] Date of Patent: Feb. 16, 1988

[54] METHOD OF DRIVING A FERROELECTRIC LIQUID CRYSTAL ELEMENT

[75] Inventors: Katsumi Kondo; Yoshiharu Nagae, both of Hitachi, Japan

[73] Assignee: Hitachi, Ltd., Tokyo, Japan

[21] Appl. No.: 767,342

[22] Filed: Aug. 21, 1985

[30] Foreign Application Priority Data

Aug. 22, 1984 [JP] Japan ........ 59-173287

[51] Int. Cl.⁴ ........ G02F 1/13

[52] U.S. Cl. ........ 350/350 S; 350/332; 350/333

[58] Field of Search ........ 350/350 S, 332, 333

[56] References Cited

U.S. PATENT DOCUMENTS

| | | | |
|---|---|---|---|
| 3,936,815 | 2/1976 | Kogure et al. | 340/324 M |
| 4,040,721 | 8/1977 | Kurita | 350/333 |
| 4,062,626 | 12/1977 | Kawakami et al. | 350/332 |
| 4,290,686 | 9/1981 | Suzuki et al. | 354/289 |
| 4,367,924 | 1/1983 | Clark et al. | 350/334 |
| 4,591,886 | 5/1986 | Umeda et al. | 350/350 S X |
| 4,608,558 | 8/1986 | Amstutz et al. | 350/350 S X |

FOREIGN PATENT DOCUMENTS

| | | |
|---|---|---|
| 0092181 | 10/1983 | European Pat. Off. . |
| 1764966 | 8/1972 | Fed. Rep. of Germany . |
| 2138946 | 2/1973 | Fed. Rep. of Germany . |
| 2347093 | 4/1974 | Fed. Rep. of Germany . |
| 2406093 | 8/1974 | Fed. Rep. of Germany . |
| 2449543 | 5/1975 | Fed. Rep. of Germany . |
| 3235143A1 | 3/1984 | Fed. Rep. of Germany . |
| 3414704A1 | 10/1984 | Fed. Rep. of Germany . |
| 56-107216 | 8/1981 | Japan . |

OTHER PUBLICATIONS

"Submicrosecond Bistable Electro-Optic Switching in Liquid Crystals," *Appl. Phys. Lett.*, vol. 36, No. 11 (Jun. 1980), pp. 899-901, by N. A. Clark et al.

R. B. Meyer et al., "Ferroelectric Liquid Crystals," *J. de Physique*, vol. 36 (Mar. 1975), pp. L-69-L-71.

Robert, J. et al., "Multiplexing Techniques for Liquid Crystal Displays," *IEEE Transactions on Electron Devices*, vol. ED-24, No. 6 (Jun. 1977), pp. 694-697.

*Primary Examiner*—Stanley D. Miller
*Assistant Examiner*—Richard F. Gallivan
*Attorney, Agent, or Firm*—Antonelli, Terry & Wands

[57] ABSTRACT

In a method of driving a liquid crystal element constituted by interposing a bistable ferroelectric liquid crystal between electrodes, a driving method of a liquid crystal element having a memory property characterized in that a first voltage signal the absolute value of a peak value of which is less than a predetermined value is applied to the ferroelectric liquid crystal in order to keep a light transmission state of said liquid crystal element, and a second voltage signal the absolute value of a peak value of which is over the predetermined value is applied to the ferroelectric liquid crystal in order to change the light transmission state of the liquid crystal element.

10 Claims, 37 Drawing Figures

(a) (b) (c)

METHOD OF DRIVING A FERROELECTRIC LIQUID CRYSTAL ELEMENT

BACKGROUND OF THE INVENTION

This invention relates to a liquid crystal element, and more particularly to a driving method of a ferroelectric liquid crystal element which exhibits an electro-optical memory function.

Ferroelectric liquid crystals are a series of compounds typified by (s) 2-methylbutyl-p-[(p-decycloxybenzylidene)amino]cynnamate (which is generally referred to as "DOBAMBC") whose molecular design and synthesis are made by Meyer et al in 1975 (Meyer et al, "J. de Phys.", 36 (1975) L-69). They exhibit a ferroelectric property in a smectic C* phase, for example. The ferroelectric liquid crystal molecules 1 form a layer structure and a helical structure in the smectic C phase as shown in FIG. 5. Incidentally, reference numeral 2 represents spontaneous polarization. It will now be assumed that a vector parallel to the long molecular axis is $\vec{n}$, a permanent dipole moment perpendicular to the former is $\vec{Ps}$, the angle between a layer normal and n is $\theta$, and a coordinates system is taken so that the layer normal and a Z axis becomes parallel. Then $\vec{n}$ and $\vec{Ps}$ can be expressed as follows:

$$\vec{n}=(\sin\theta\sin(2\pi Z/Lo),\ \sin\theta\cos(2\pi Z/Lo),\ \cos\theta)$$

$$\vec{Ps}/|\vec{Ps}|=(\cos(2\pi Z/Lo),\ \sin(2\pi Z/Lo),\ O)$$

Although the ferroelectricity has been confirmed for some of the smectic phases other than C* phase, the description will be hereby made on the C* phase by way of example.

When an electric field higher than a threshold voltage Ec is applied perpendicularly to the helical axis, the molecules move and the helical structure becomes unwound while keeping the layer structure, and the permanent dipole moment perpendicular to the long axis of each molecule becomes parallel to the field. At the same time, not only the liquid crystal molecules in one layer but also those in all layers are arranged parallel to one another. Two kinds of state where the molecules are inclined at angles $\pm\theta$ can be attained as shown in FIG. 2(*c*) by selecting the direction of the field, and a display element or an optical shutter element can be fabricatd by either utilizing the birefringence or adding a dichroic dye to the liquid crystal.

When the field is removed, the ferroelectric liquid crystal molecules generally return to the original helical structure as shown in FIG. 2(*b*) due to their elastic righting moment of orientation, but a bistable state in which the helix is kept unwound can be accomplished such as shown in FIGS. 2(*a*) and 2(*c*) even at the time of zero field by, for example, positively utilizing the interface effect between glass and the liquid crystal by, for example, sealing the liquid crystal in an extremely thin cell which is about 1 μm thick, as proposed by Clark and Lagerwall (N. A. Clark and S. T. Lagerwall, "Appl. Phys. Lett.", 36 (1980), 899; Japanese Patent Unexamined Publication No. 56-107216 corresponding to U.S. Serial No. 110,451 filed on Jan. 8, 1980, U.S. Pat. No. 4,367,924, etc.), or in a certain kind of smectic phase other than the smectic C phase.

As described above, the ferroelectric liquid crystal has the bistable state so that an electro-optical memory function can be accomplished. Therefore, the future applications of the liquid crystal include large-scale displays having a large number of picture elements, high precision displays, optical shutters, polarizers, and so forth. Although the possible application of the ferroelectric liquid crystal to high information capacity displays and the like has been discussed in the past, it has not been clarified in practice how to drive the liquid crystal by applying what voltage.

SUMMARY OF THE INVENTION

The present invention is directed to provide a practical driving method of a liquid crystal element having a memory function on the basis of the relation between the waveform of an applied voltage and the light transmission factor of the ferroelectric liquid crystal that has been found out experimentally by the inventors of the present invention.

The driving method in accordance with the present invention is characterized in that the memory property of a ferroelectric liquid crystal element is utilized positively.

DESCRIPTION OF THE PREFERRED EMBODIMENTS

The present invention is based upon the several experimental facts found out by the inventors of the invention.

Figure 3:
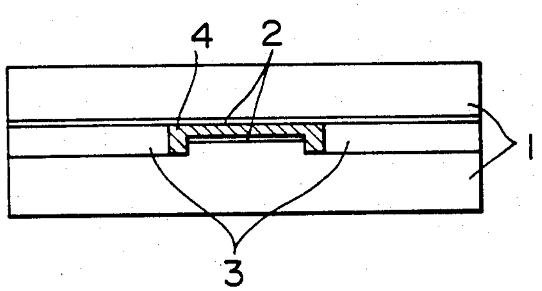
FIG. 3 is a cross section showing the structure of a liquid crystal element.
Figure 4:
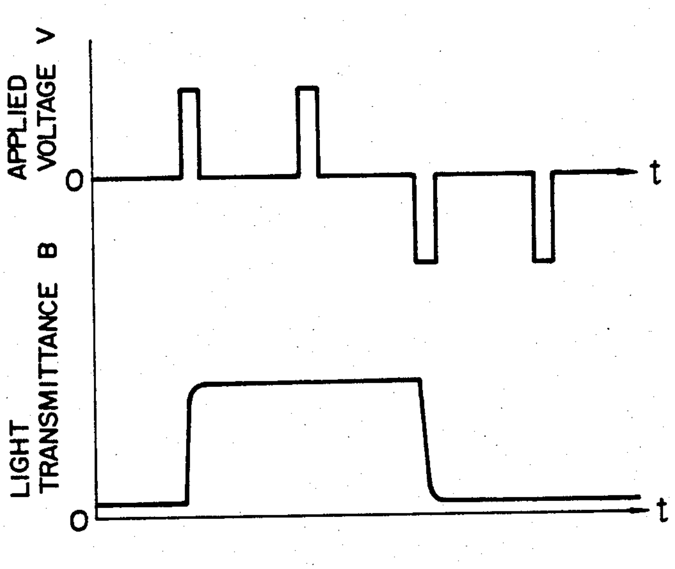
FIGS. 4 to 7 show views useful for explaining the characteristics of a liquid crystal element.
Figure 5:
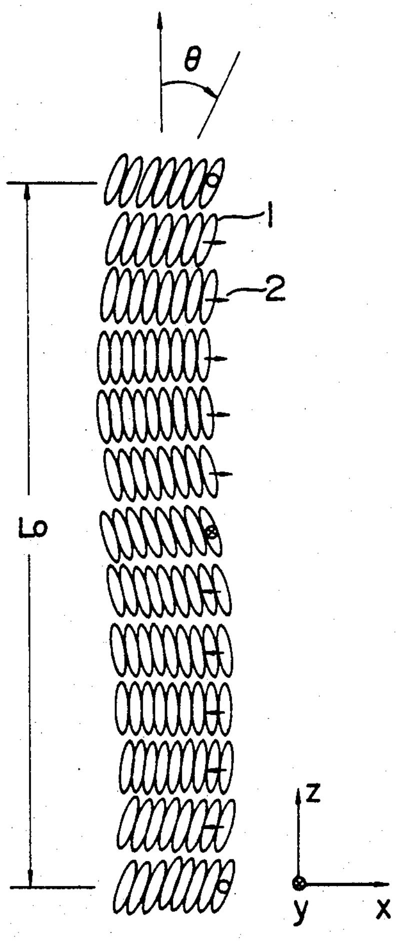
FIG. 5 PRIOR ART

First of all, the structure of an experimental element will be explained with reference to FIG. 3.

The liquid crystal element consists of two transparent substrates 1, each having a transparent electrode 2 and consisting of glass, plastics, or the like, a PET (polyethylene terephthalate) film spacer 3 and a ferroelectric liquid crystal 4. One of the transparent substrates 1 is etched by use of a photoresist and hydrofluoric acid solution to form a step such as shown in FIG. 3. If such a step is used, a liquid crystal element having a gap of below 2 μm can be produced stably irrespective of the fact that films which are below 2 μm thick are difficultly available. A four-component mixed material shown in Table 1 is used as the ferroelectric liquid crystal. The gap is 1.6 μm, and surface treatment such as coating of an orientation film, rubbing, or the like is not at all applied to the transparent electrode.

TABLE 1

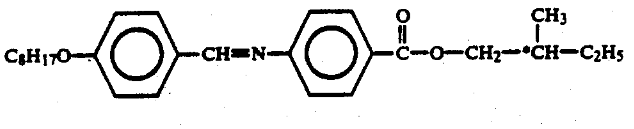

21 mole %

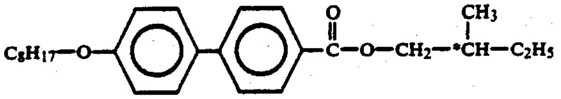

21 mole %

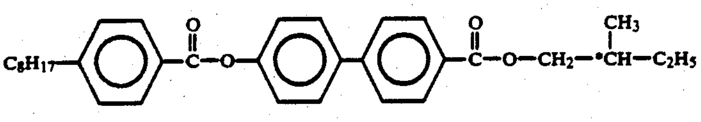

29 mole %

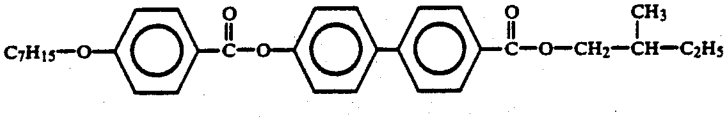

29 mole %

Crystal phase ⇄ (<0° C.) smectic C* phase ⇄ (52° C.) smectic A phase ⇄ (118° C.) isotropic phase Next, the orientation method of the liquid crystal molecules, will be described.

First of all, the liquid crystal is heated to a temperature which is a little higher than the liquid crystal phase and the isotropic phase transition point (about 120° C. in this case) to turn once the liquid crystal into the isotropic phase, and is then cooled gradually at a rate of about 0.1° C./min in order to turn the liquid crystal into the smectic A phase (in which the long axis of the molecules is perpendicular to the layer surface). In this example, the liquid crystal gradually grows with the long axis of molecules being parallel to a liquid crystal-spacer film interface and with the layers being aligned perpendicularly due to the interface effect on the cell side surfaces (liquid crystal-spacer film interface). Then, a good mono-domain is formed in a range which is sufficient for measurement. In the mono-domain growing process, the smectic A phase is formed in which the long axis of molecules and the layer normal are perpendicular to one another. When the liquid crystal is further cooled gradually down to below 54° C., the smectic C phase is attained in which the long axis of molecules is inclined from the layer normal while keeping the flatness of the layers. It has been confirmed from the following observation that the spiral disappears and the bistable state is attained in this liquid crystal element.

The result of the measurement of the relation between the waveform of an applied voltage to the element and the light transmittance of the element (hereinafter referred to as the "brightness") will be described. The electro-optical characteristics were measured under a crossed nicol of a polarizing microscope to which a light intensity sensor was fitted, using a monochroic light source. The sample was controlled at a room temperature 23° C. The liquid crystal exhibited an electro-optical memory property (the inventors confirmed that even after the field was removed, the memory lasted for several months) due to the bistability of the molecular orientation. The dark and bright light transmission states could be inverted when a pulse whose polarity was opposite to that of the previously applied pulse was applied. The brightness remained when the polarity of the pulse of the applied voltage to the liquid crystal was the same as that of the last pulse of those applied previously.

When a voltage pulse (having a peak value $V_{LC}$) having the same width (time width) but an opposite polarity was applied after the application of a voltage pulse having a sufficient width (time width) and a sufficient peak value to completely invert the dark and bright light transmission state, optical response did not occur if the absolute value of $V_{LC}$ was below a certain value (inclusive of zero). The present invention defines the absolute value of a threshold voltage, at which the optical response starts occurring, as $Vth^{(+)}$ when $V_{LC}>0$ and $Vth^{(-)}$ when $V_{LC}<0$. Furthermore, the present invention defines a voltage zone in which $-Vth^{(-)}<V_{LC}<Vth^{(+)}$ as an "insensitive zone". If the absolute value $|V_{LC}|$ of the applied voltage to the liquid crystal is greater than $Vth^{(+)}$ or $Vth^{(-)}$, the greater the voltage value, the greater becomes the change quantity of the brightness B. However, the brightness B has saturation values $Vsat^{(+)}$ AND $Vsat^{(-)}$, and does not depend any more upon the voltage beyond a certain voltage value.

Figure 1A:
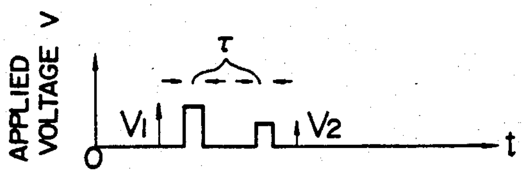
FIGS. 1*a* to 1*c* are views for showing the characteristics of a ferroelectric liquid crystal.
Figure 1B:
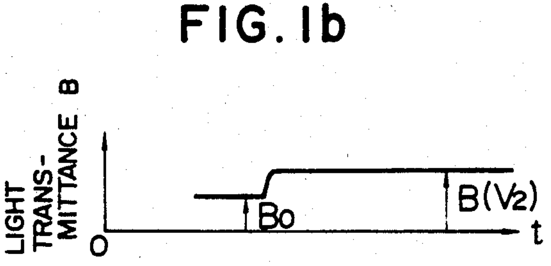
Figure 1C:
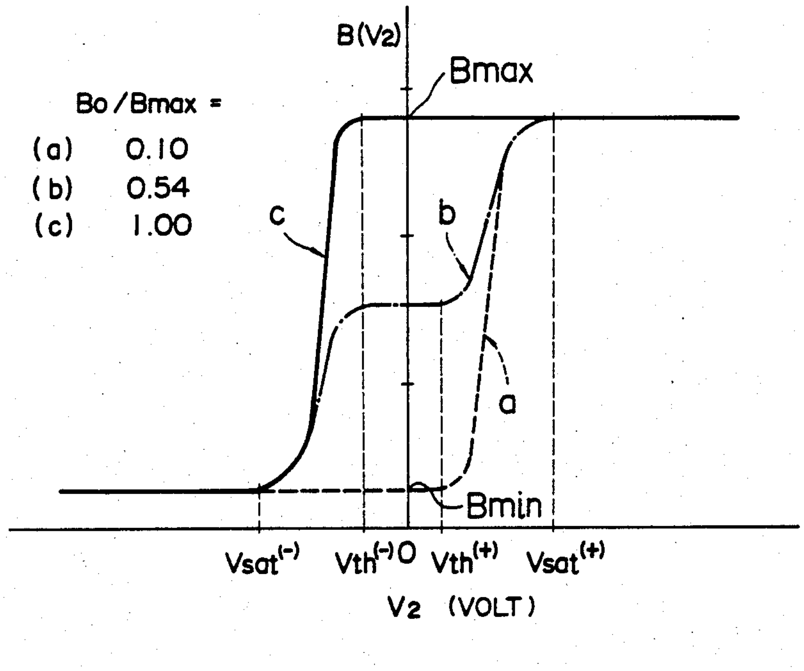
Figure 2:
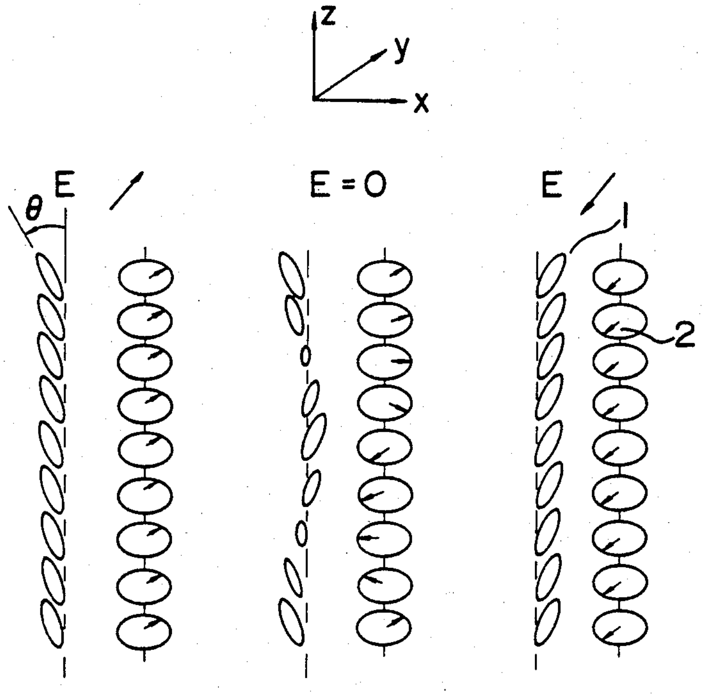
FIG. 2 PRIOR ART
FIGS. 2*a*, *b* and *c* show views useful for explaining the molecular orientation states of the ferroelectric liquid crystal.

FIG. 1*c* shows the result of measurement of the brightness (FIG. 1*b*) when the two voltage pulses shown in FIG. 1*a* are applied. That is, the initial value of the brightness Bo is determined by the previous voltage pulse (peak value $V_1$) among the applied signals. If $V_1$ is positive and sufficiently high, the initial value Bo of the brightness is a maximum $B_{max}$, and exhibits the characteristics represented by solid line c in the diagram (FIG. 1*c*) in which the abscissa represents the second voltage pulse (peak value $V_2$). If $V_1$ is negative and sufficiently great, on the other hand, the initial value Bo of the brightness is $B_{min}$, and the characteristics with respect to $V_2$ become such as those represented by dash line a in FIG. 1*c*. If $V_1$ is an arbitrary predetermined value and the initial value Bo of the brightness at this time is $B_b$, the characteristics with respect to $V_2$ become such as those represented by one-dot-chain line b in FIG. 1*c*.

The threshold voltages $Vth^{(+)}$, $Vth^{(-)}$ and the saturation voltages $Vsat^{(+)}$, $Vsat^{(-)}$ described above are also shown in FIG. 1*c*.

In FIG. 1c, the pulse width is constant at 1 ms.

The inventors of the invention confirmed from the embodiments that both the threshold voltages $Vth^{(+)}$, $Vth^{(-)}$ were about 4 V, and the saturation voltages $Vsat^{(+)}$, $Vsat^{(-)}$ were about 11 V irrespective of the initial state. Incidentally, the observation was made within a range of about $(0.5)^2$ $mm^2$, and the intermediate state of the brightness was attained as a large number of domains of the bright and dark two kinds of state ranging from several to some dozens of μm existed mixedly. From the experiment described above, the electro-optical memory property and hysteresis corresponding thereto, and the existence of the insensitive zone, that is, the sharp threshold value characteristics between $V_{LC}$ and B, were confirmed. The present invention positively utilizes these memory properties and the existence of the insensitive zone, and can function as display elements, optical shutter elements, polarization elements, and so forth.

Figure 6A:
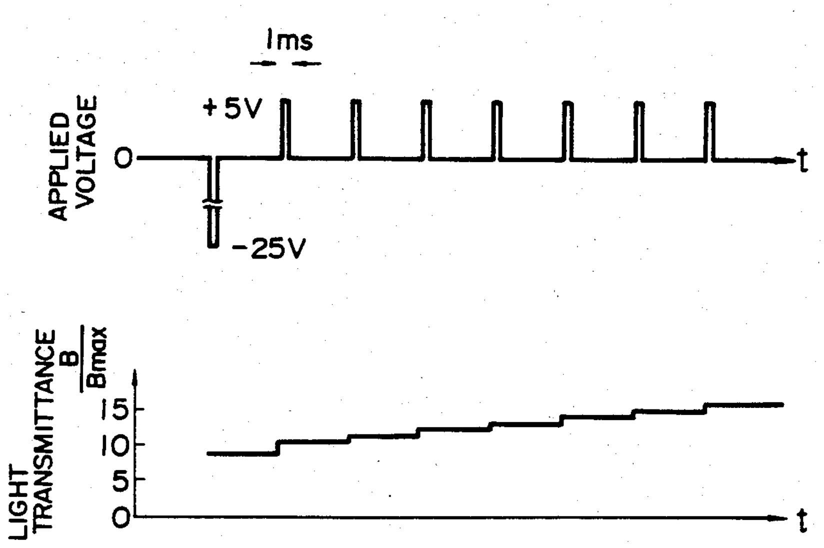
Figure 6B:
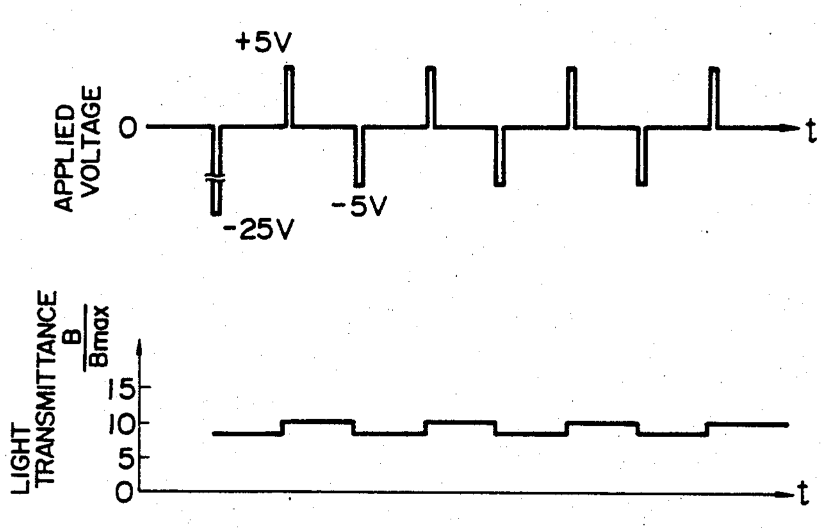

The above explains the result of experiments that resulted in the completion of the present invention. Furthermore, the following two experiments were carried out while assuming the case of matrix driving. First, optical response was measured by repeatedly applying a voltage $V_{LC}$ a little higher than the insensitive zone ($V_{LC} \gtrsim Vth(+) \approx Vth(-)$; 5 V in this case). The result is shown in FIG. 6. Here, the brightness uses those values which are standardized by its maximum value $B_{max}$. As can be seen from the result of experiments, the change of brightness was gradually built up as the pulses of the same polarity were repeatedly applied as shown in FIG. 6a, whereas the build-up did not occur when the polarities were sequentially inverted as shown in FIG. 6b. This means that when a voltage is applied to a picture element whose brightness is not desired to be changed, the voltage value must be kept within the insensitive zone or even if it exceeds the insensitive zone, the pulses having the same polarity should not be applied continuously.

Figure 7:
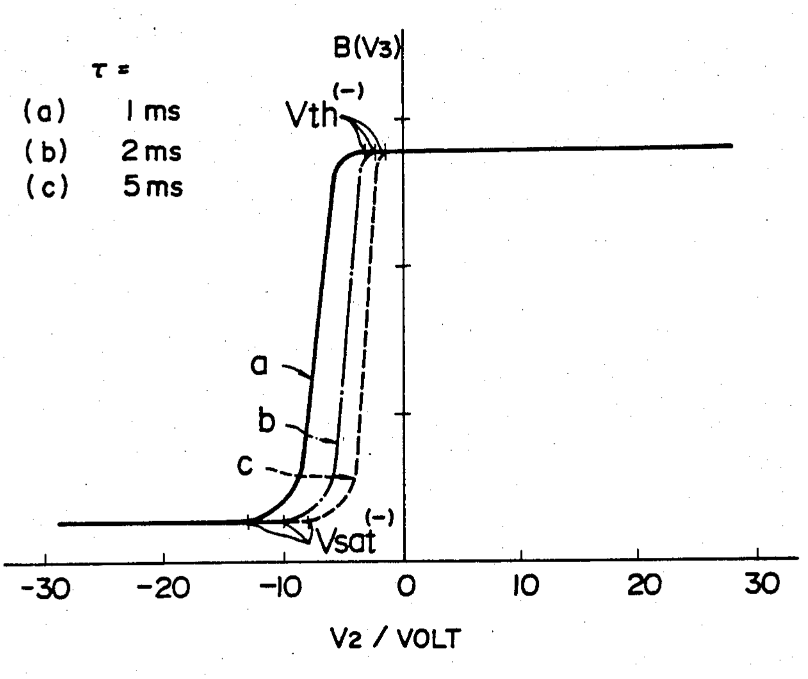

In another experiment, the relation between the voltage and the brightness was measured in the same way as in FIG. 1 but by changing the pulse width τ. An example is shown in FIG. 7. When the pulse width τ was increased, both of $Vth^{(-)}$ and $Vsat^{(-)}$ dropped. This result held true of the three characteristics in FIG. 1, and means that driving is possible even by the modulation of pulse width τ.

Though the description that has been given so far deals with a liquid crystal element of the type in which the light passes through the element from its reverse, the same relation can be established in a so-called "reflection type element", too, in which a reflector is disposed on the reverse of the element.

The relation also holds true of a so-called "guest-host type" element in which a dychroic dye is mixed into the liquid crystal. In this case, the substrate on the reverse side need not be transparent.

Next, some definite driving waveforms and driving circuits suitable for practicing the present invention will be described with display elements by way of example. Generally, peculiar driving waveforms are employed to drive the liquid crystal elements in accordance with their types, such as ON-OFF binary display, a display in which gray-scale must be displayed, and so forth.

In order to describe the driving method of the liquid crystal element as the object of the present invention, the driving systems are classified as tabulated in Table 2, and the definite driving waveforms and driving circuits will be described on the respective systems.

TABLE 2

| Embodiment | Gray-scale | Display system | mean value of applied voltage |
|---|---|---|---|
| 1 | nil | static | ≠ 0 |
| 2 | (binary display) | | = 0 |
| 3 | | matrix | ≠ 0 |
| 4 | | | = 0 |
| 5 | yes | static | ≠ 0 |
| 6 | | | = 0 |
| 7 | | matrix | ≠ 0 |
| 8 | | | = 0 |

The classification shown in Table 2 is made in the following way. The first classification is made in accordance with the binary display and the display having the gray-scale. The second is made in accordance with static driving and matrix driving, and the third is made whether the mean value of the voltage waveforms applied to the liquid crystal is zero or not. In this manner, a total of eight kinds of driving methods can be classified. Hereinafter, embodiments of the present invention will be described in detail on the respective classifications.

[EMBODIMENT 1]

Embodiment 1 corresponds to the class of binary display, static driving, and the mean value of the impressed voltage to the liquid crystal being not zero.

Figure 8:
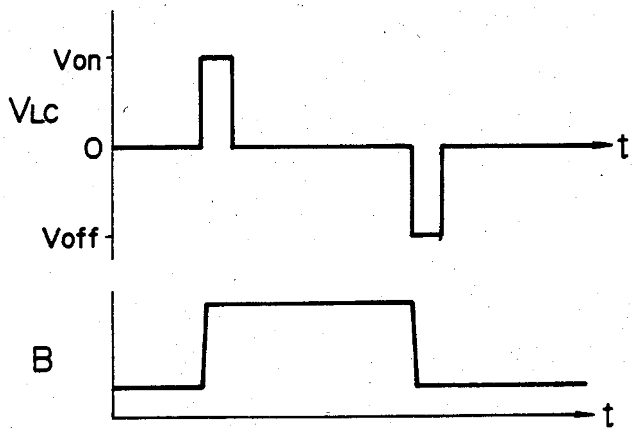
FIGS. 8 to 30 show waveforms and circuits diagrams useful for explaining embodiments of the present invention.

In this embodiment, the driving method is the simplest, and the display state (the bright or dark state) is determined by applying a voltage pulse of the absolute value of the peak value exceeding the insensitive zone to the liquid crystal. The relation between the impressed voltage and the brightness of the liquid crystal element is shown in FIG. 8. When a voltage pulse in a positive direction as a first signal is applied, the brightness increases, and even after the application of the voltage pulse (that is, when a second signal of a zero voltage is applied), the bright state is kept due to the memory property of the ferroelectric liquid crystal. This state continues until another first signal, that is, a voltage pulse in a negative direction, is applied, and the bright state changes to the dark state when this voltage pulse is applied. This state is also kept due to the memory property. Here, the peak values $V_{on}$ and $V_{off}$ applied to the liquid crystal in the drawing should satisfy the relation $V_{on} > Vth+$ and $V_{off} < Vth-$.

Preferably the relation $V_{on} \geqq Vsat+$ and $V_{off} \leqq Vsat-$ is established.

Figure 9:
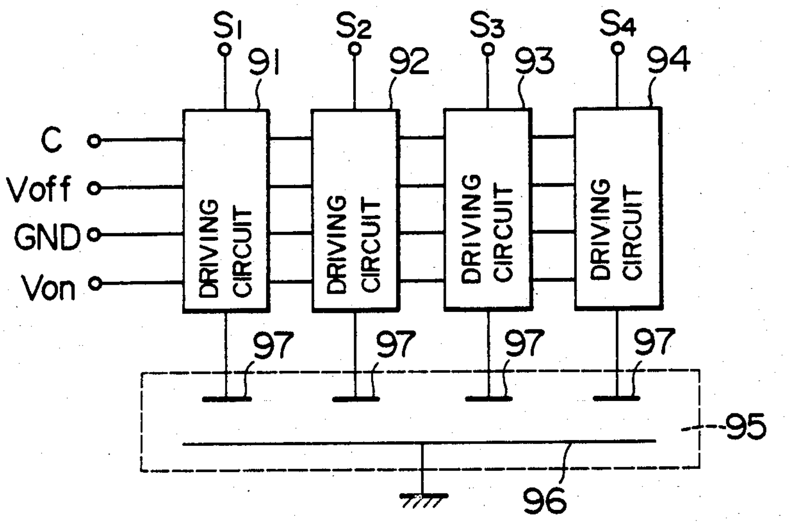

A driving circuit and the electrode arrangement of the liquid crystal element for applying these voltage pulses are shown in FIG. 9.

In the case of static driving, a group of a plurality of segment electrodes 97 are disposed in such a manner as to face a common electrode 96 in the liquid crystal element 95, and the liquid crystal is sandwiched between both electrodes. Each segment electrode is equipped with one driving circuit 91–94. A display signal $S_1$-$S_4$ for determining the display state of each segment electrode, a clock signal C, d.c. voltages $V_{on}$ and $V_{off}$ corresponding to the driving waveforms and a ground potential GND are applied to the input terminal of each driving circuit.

Figure 10:
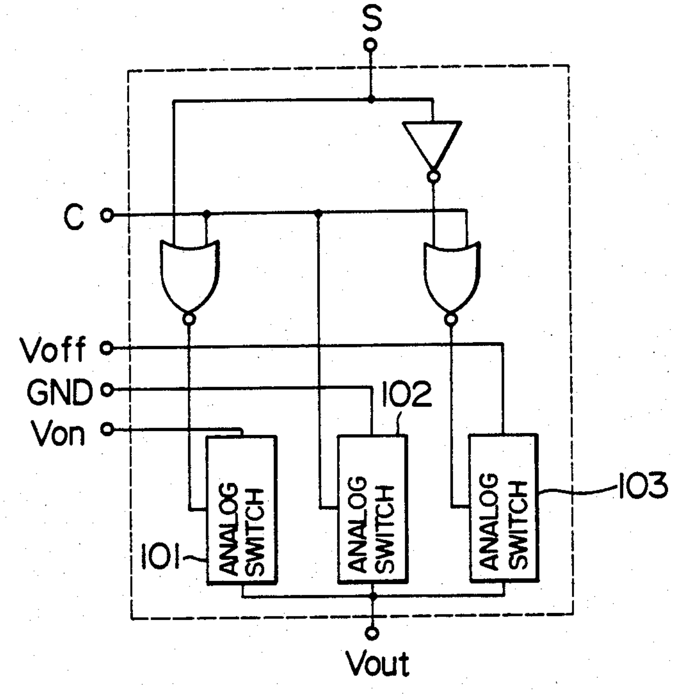

The driving circuit 91–94 is shown in detail in FIG. 10. The circuit shown in the drawing constitutes as a whole a switch controlled by the display signal S and the clock signal C, and has a function of selecting and producing one of the input voltage $V_{on}$, GND and $V_{off}$ having the three levels.

In the drawing, reference numerals 101, 102 and 103 represent analog switches which consist of MOS transistors, for example, and which are referred to as "transfer gates", respectively.

Figure 11:
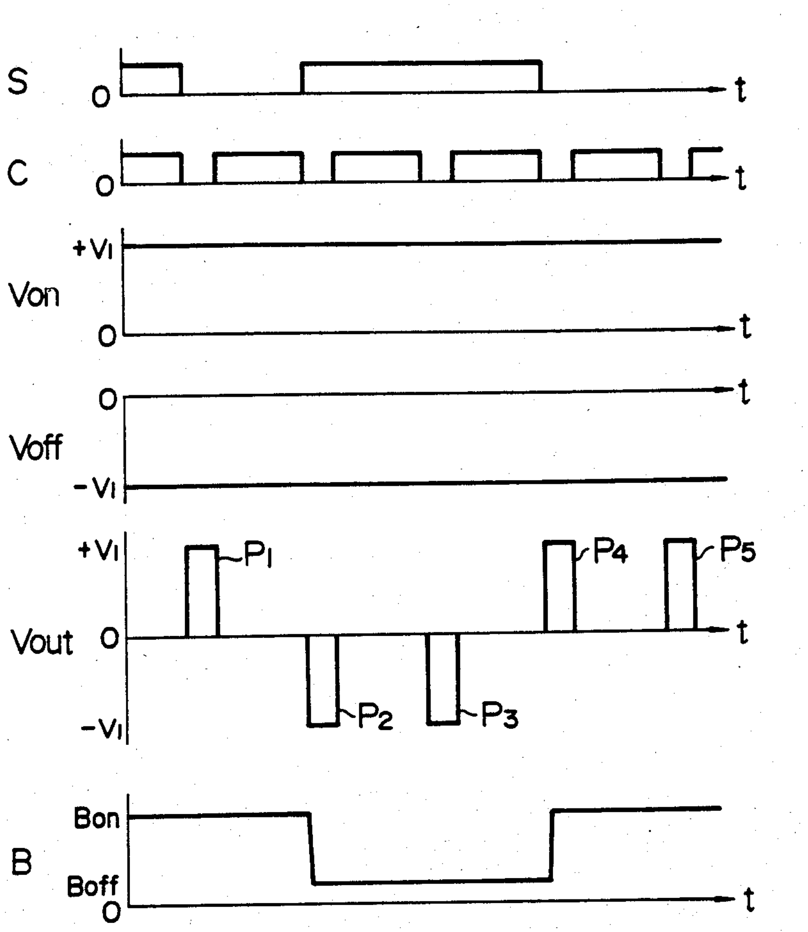

FIG. 11 shows the time sequence representing the operation of this circuit. Here, the display signal S selects the bright state at the time of the logic zero "0" and the dark state at the time of "1". When $+V_1$ volt and $-V_1$ volt are applied as $V_{on}$ and $V_{off}$, respectively, the output $V_{out}$ of the driving circuit produces the positive and negative voltage pulses in response to the display signal S as shown in the drawing, so that the brightness B of the liquid crystal element changes in accordance with the display signal S, thereby accomplishing the predetermined display.

Incidentally, when the display state does not change, the third pulse $P_3$ and the fifth pulse $P_5$ in FIG. 11 may be omitted.

In each of the embodiments of the invention, the description will be made while the reference level of the signal applied to the electrode is set to the ground level 0, but the reference level of the signal applied to the electrode may naturally be arbitrary.

[EMBODIMENT 2]

This embodiment is different from Embodiment 1 only in that the mean value of the impressed voltages applied to the liquid crystal is made zero. This embodiment exhibits the effect of preventing the electrochemical degradation of the liquid crystal.

The driving circuit and the electrode configuration of this embodiment are exactly the same as those of FIG. 9. However, among the inputs of the driving circuits 91-94, only $V_{on}$ and $V_{off}$ are different.

Figure 12:
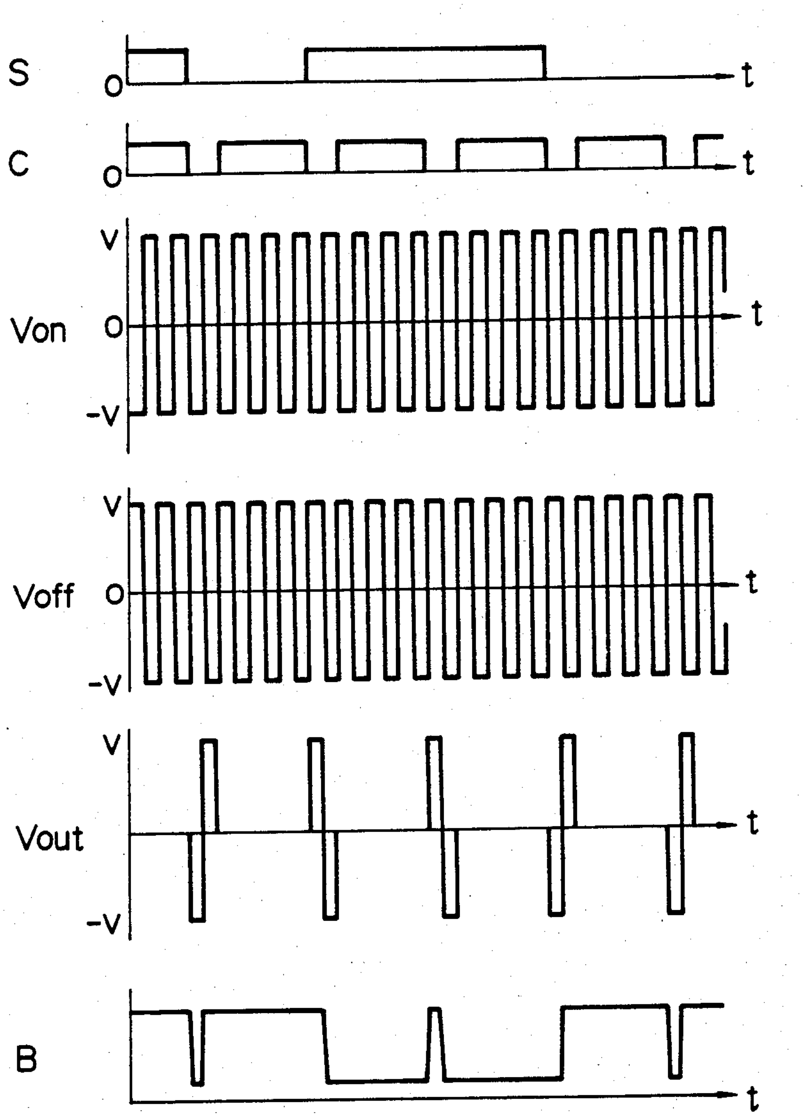

FIG. 12 shows the input signal and output of each driving circuit 91-94 and the brightness B of the liquid crystal element. Among them, the display signal S and the clock signal C are exactly the same as those in FIG. 11, but $V_{on}$ and $V_{off}$ are a.c. square waves having an amplitude of V volt. The a.c. square waves having their phases inverted with one another are applied. Incidentally, $V_o$ has a phase such that it is $-V$ in the former half period of the clock signal "0" and $+V$ in the latter half.

When the display signal S such as shown in the drawing is applied to the inputs $V_{on}$ and $V_{off}$, the output $V_{out}$ becomes such as shown in the drawing. In other words, when the display signal S is "0", the a.c. square waves are produced in the sequence of $-V$ and $+V$ in synchronism with the clock signal, and when the display signal is "1", the a.c. square waves are produced in the sequence of $+V$ and $-V$. In this case, the brightness of the liquid crystal element is determined by the latter polarity of each a.c. square wave. That is, when the a.c. square wave in the sequence of $-V$ and $+V$ is applied, the display state is dark while $-V$ is applied, but since $+V$ is applied next, it changes to the bright state. This bright state is held for the period until the next pulse is applied, so that the liquid crystal to which the pulses in the sequence of $-V$ and $+V$ are applied is in the bright state. Similarly, the liquid crystal to which the a.c. square waves in the sequence of $+V$ and $-V$ are applied is in the dark state.

In this case, too, it is not necessary to apply the driving signal when the same display state continues, so that the driving signal may be applied only when the display state changes.

[EMBODIMENT 3]

This embodiment corresponds to the class of binary display, matrix driving and mean value of the applied voltage to the liquid crystal not being zero.

First of all, matrix driving will be described with reference to FIG. 13. In matrix driving, a plurality of X-Y electrodes such as $X_1$, $X_2$, $Y_1$, $Y_2$ are provided, and the points of intersection constitute picture elements. Driving circuits $SX_1$, $SX_2$, $SY_1$, $SY_2$ are connected to these electrodes, respectively.

It will now be assumed that each driving circuit is an analog switch which can select one output from two inputs. It will also be assumed that the respective inputs are a selection waveform XS for driving the X electrode, a non-selection waveform XNS, YS for driving the Y electrode and a non-selection waveform YNS. The signals for producing either one of each input pair will be assumed to be $X_1$, $X_2$, $Y_1$, $Y_2$.

Figure 14:
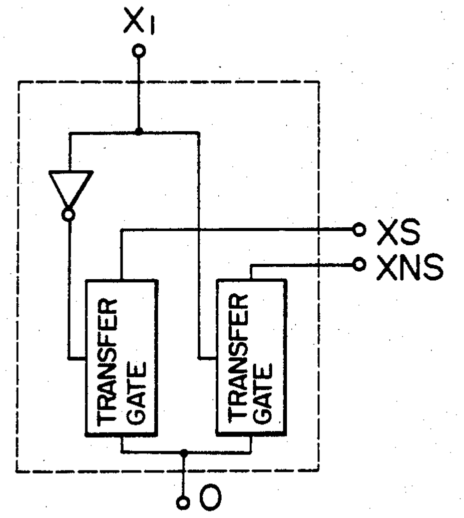

It is preferred to use a transfer gate shown in FIG. 14 as an example of each X, Y electrode driving circuit.

Figure 15:
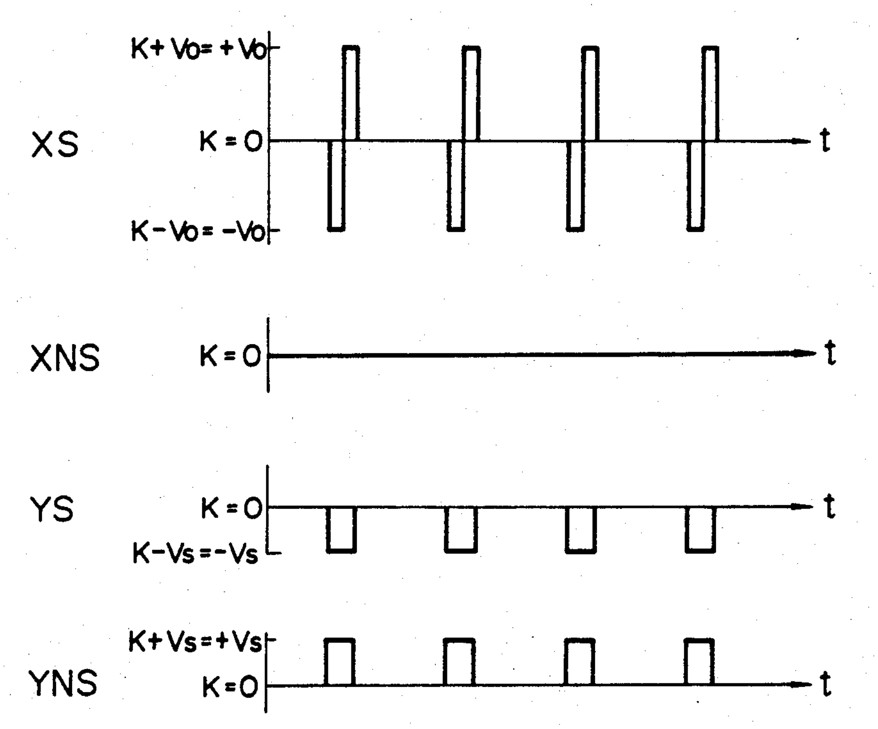

Next, the waveforms XS, XNS, YS, YNS are shown in FIG. 15. These waveforms consist of pulse voltage waveforms having a suitable period, and XS uses a pair of positive and negative pulses having an amplitude $V_o$ as one unit. XNS is a ground level 0 as a reference level K.

The waveforms YS and YNS are the pulses of opposite polarities, respectively, and their pulse widths are twice the pulse width of the waveform XS.

Figure 13:
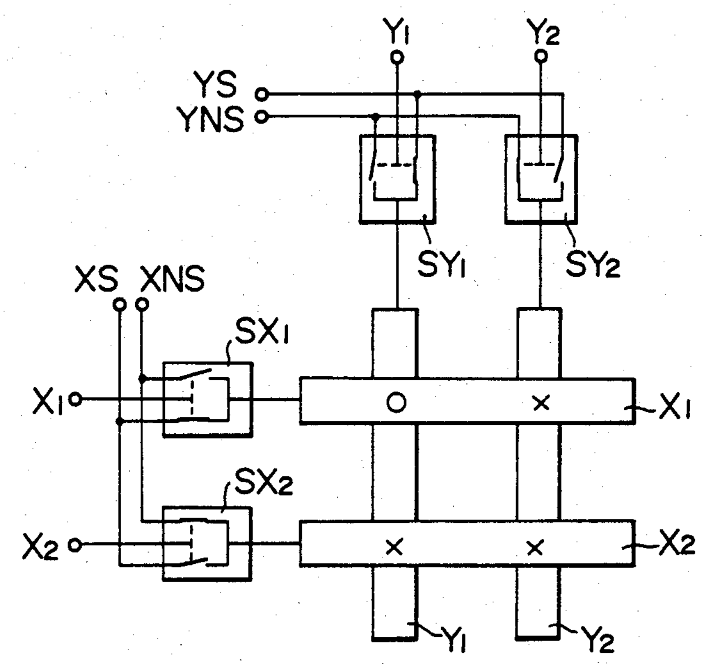
Figure 16:
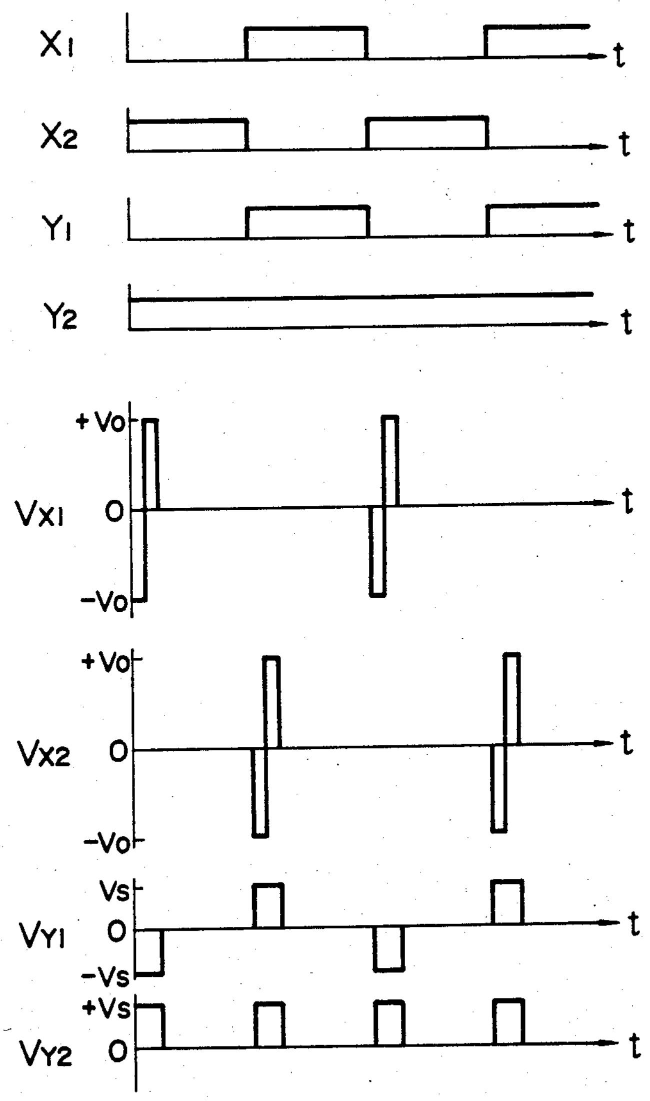

FIG. 16 shows each signal waveform in the case where the mark O indicates the bright state and the mark × represents the dark state as each picture element in FIG. 13 is abbreviated. In FIG. 16, $X_1$ and $X_2$ indicate that the signal "0" is selected and $Y_1$ and $Y_2$ also represent that the signal "0" is selected. In this way, the voltages $V_{X1}$, $V_{X2}$, $V_{Y1}$, and $V_{Y2}$ which are applied to the respective electrodes are determined.

Figure 17:
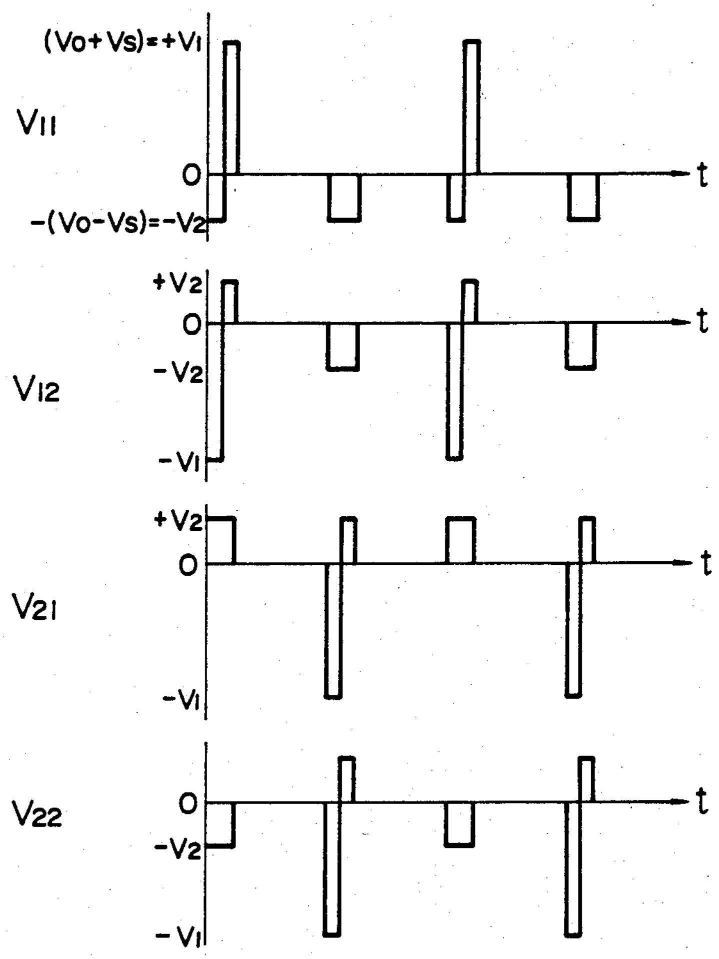

Due to this, the voltage which is applied to each pixel is such that, for the pixel 11, $V_{11}=V_{X1}-V_{Y1}$, $V_{12}=V_{X1}-V_{Y2}$, $V_{21}=V_{X2}-V_{Y1}$, and $V_{22}=V_{X2}-V_{Y2}$. These voltages are shown in FIG. 17. In FIG. 17, it is the pulse having the peak values of $\pm V_1$ that substantially changes the display state. The other pulses of the peak value $+V_2$ are the voltages in the insensive zone as previously defined, in which $|V_2| < |V_{th}$. Therefore, the bright or dark state is decided in dependence on the positive or negative sign of the pulse of the peak value$\pm V_1$. On one hand, the absolute value $|V_1|$ of the peak value may be preferably set such that $|V_1| \geqq |V_{th}$ or $V_1| \geqq |V_{sat}|$. Although FIG. 17 shows the waveforms when $V_s=\frac{1}{2}V_0$, it is sufficient that the value of $V_0-V_s$ is smaller than $V_{th}$.

[EMBODIMENT 4]

Figure 18:
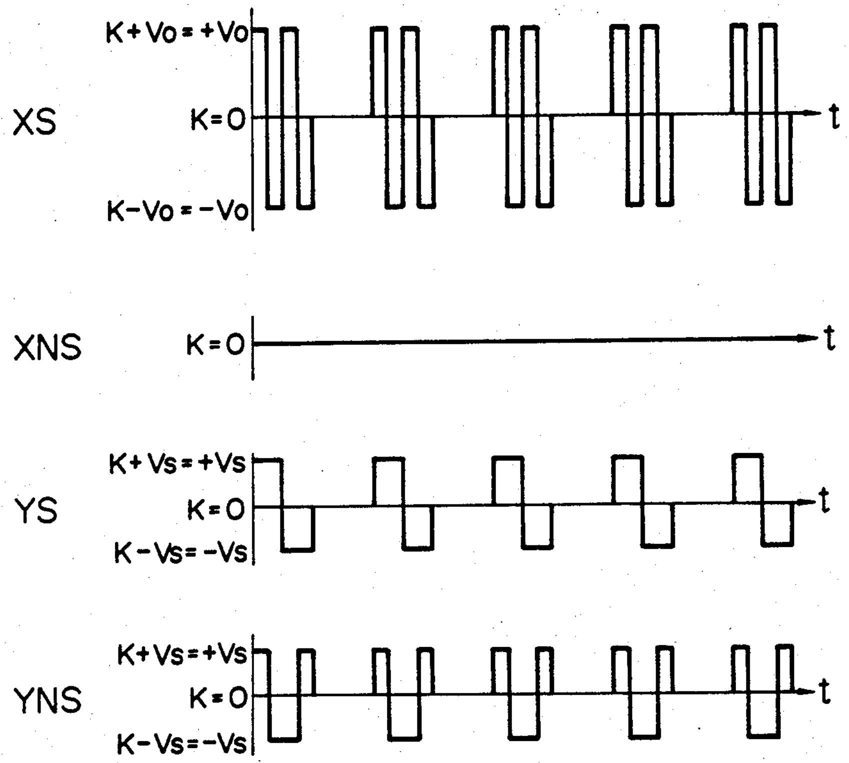

This embodiment is constituted such that the mean value of the voltage which is applied to the liquid crystal becomes 0 as compared with the embodiment 3. For this purpose, the waveforms XS, XNS, YS, and YNS in the embodiment 3 may be changed as shown in FIG. 18.

Figure 19A:
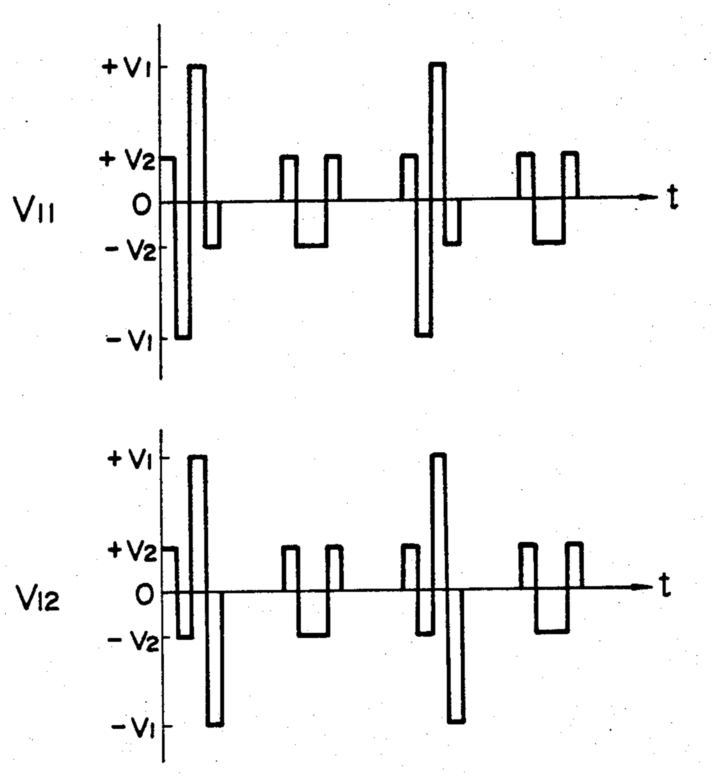
Figure 19B:
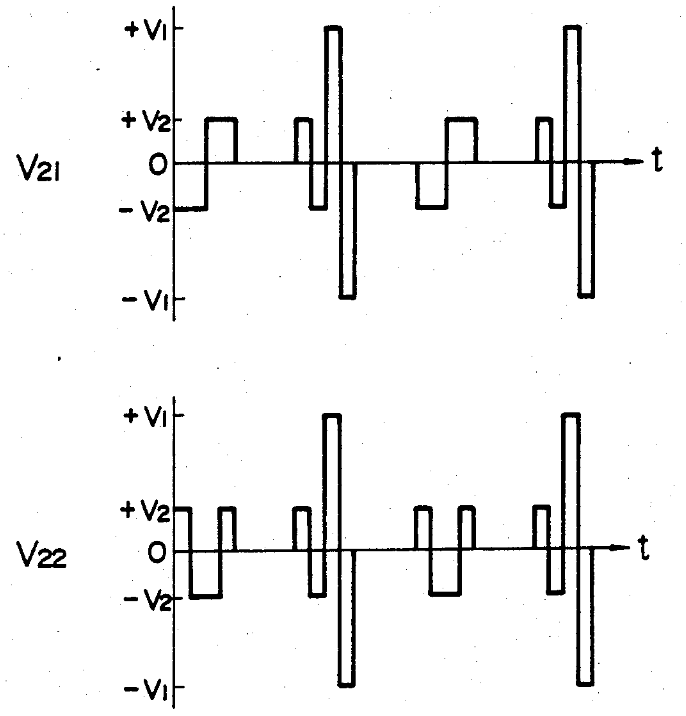

In this case, the voltages which are applied to the liquid crystal become as shown in FIGS. 19*a* and 19*b* depending upon the display state (the display state of FIG. 13 is shown as an example). As will be understood from these diagrams, only the voltage pulse of the amplitude $V_1$ is concerned with the change of the display state. However, as a pulse which is applied to the picture element of the bright display, the pulse having the amplitude of $V_1$ is applied in accordance with the sequence of negative→positive, while the pulse is applied to the picture element of the dark display in accordance with the sequence of positive→negative. In this case, since the display state is determined by the latter pulse, a predetermined display can be accomplished.

[EMBODIMENT 5]

This embodiment relates to a driving method in case of a static driving, and a gray-scale display and in the case where the mean value of the applied voltages to the liquid crystal is not 0. In this driving method, to obtain a predetermined brightness when the gray-scale is displayed, the display state before the pulse corresponding to the gray-scale is given has to be constant; therefore, the liquid crystal is set to the dark state for a predetermined time period before the pulse is applied. This may be set to the bright state.

Figure 20:
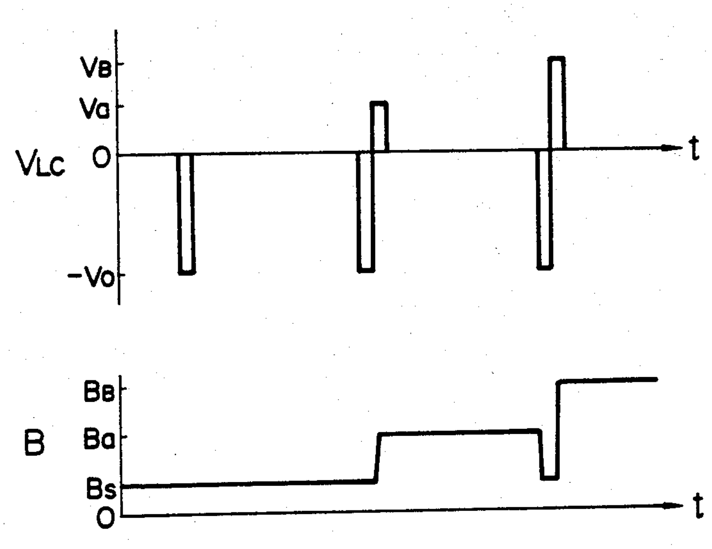

This driving method was thought out from the experimental fact of FIG. 20. Namely, good gray-scale display could be attained by applying the voltage corresponding to a predetermined brightness immediately after the voltage which is applied to the liquid crystal was temporarily set to $-V_0$. In this case, $|V_0|$, $|V_a|$, and $|V_b|$ are larger than $V_{th}|$, and $|V_a|$ and $|V_b|$ are smaller than $|V_{sat}|$.

Figure 21:
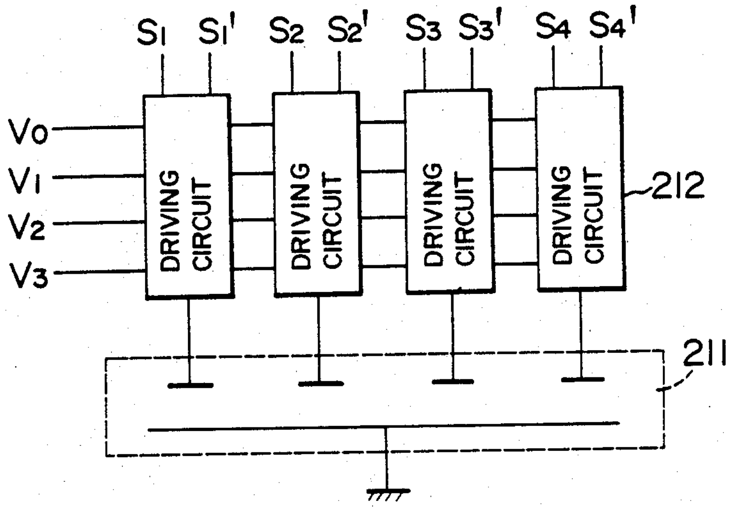

FIG. 21 shows a schematic diagram of a circuit which is used in this embodiment. A driving circuit 212 is connected to each segment electrode of a liquid crystal display element 211 for a static driving. The driving circuits 212 receive the voltages $V_0$, $V_1$, $V_2$, and $V_3$ so that the gray-scale of four stages can be displayed and it is assumed that one of them is outputted in response to a signal of $S_1$, $S_1'$, or the like.

Figure 22:
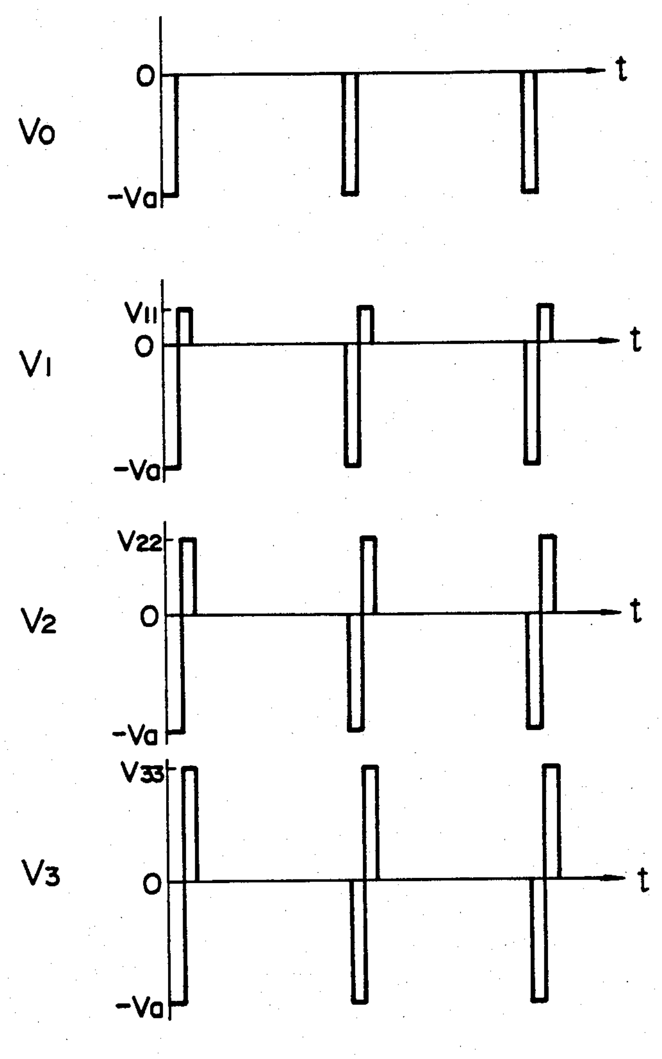

FIG. 22 shows V0 to V4.

In FIG. 22, −Va denotes a peak value of the pulse to determine a reference brightness; for instance, the relation $|-V_a|>|V_{sat}+|$ may be preferably set. V11, V12, and V33 in the voltages V1 to V3 are peak values of the pulse to actually determine the gray-scale and, in this example, $V_{11}<V_{22}<V_{33}$. In the voltage $V_0$, the peak wave of the pulse to determine the gray-scale is set to 0. It is obvious that the peak value of the pulse to determine the peak wave may be set to any value.

Figure 23:
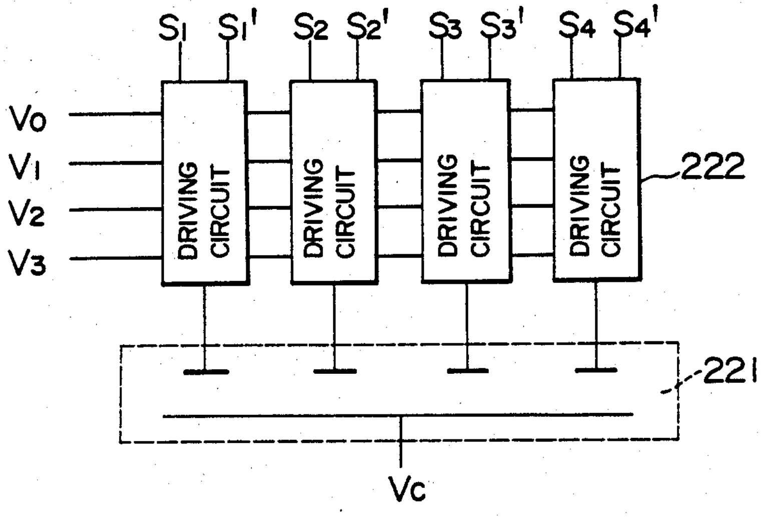
Figure 24:
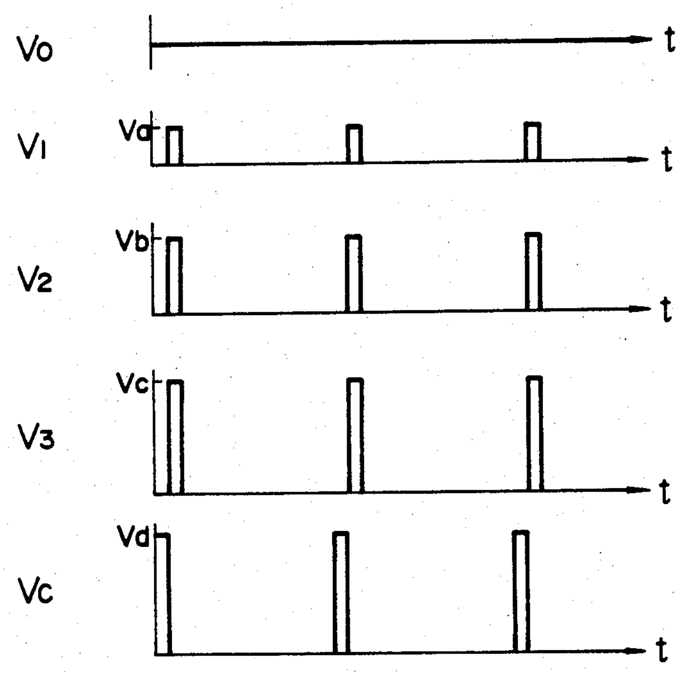

Due to this, the gray-scale display can be accomplished. On the other hand, as shown in FIG. 23, there is also a method whereby a driving circuit to apply the voltage $V_c$ to the common electrode side is connected. FIG. 24 shows the waveforms of $V_0$ to $V_4$ and $V_c$ in this case. Even by way of this method, good gray-scale display can be attained. The foregoing method is characterized in that any of those waveforms is constituted by the voltage pulse of the single polarity.

[Embodiment 6]

Figure 25:
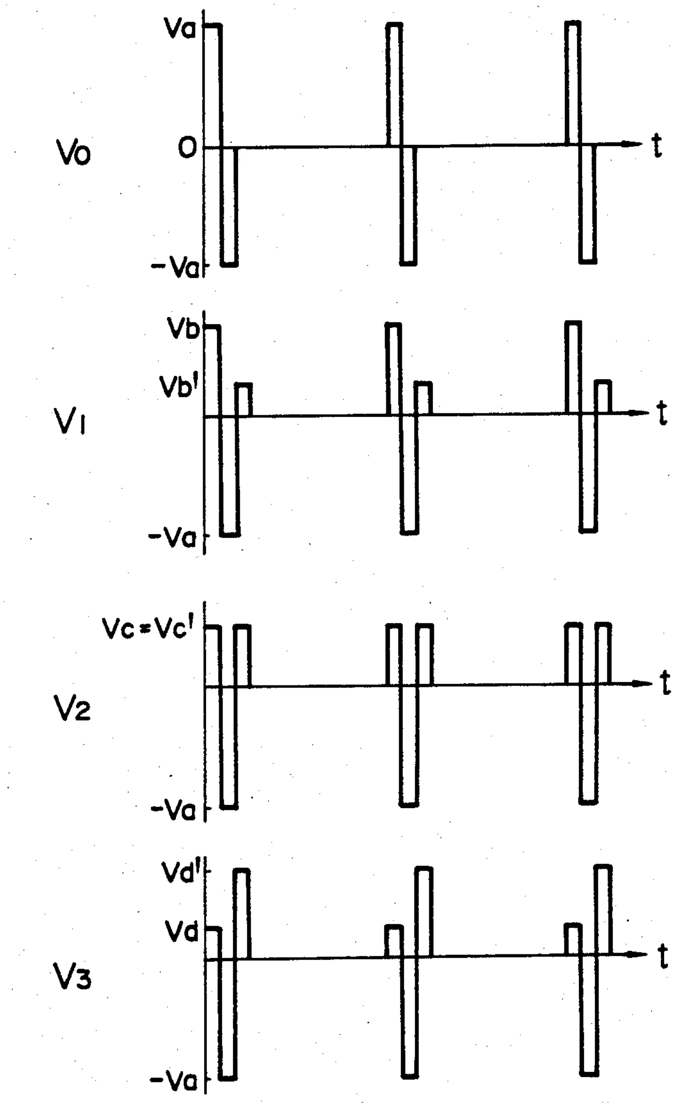

A feature of this embodiment is that the mean value of the voltage which is applied to the liquid crystal is 0 as compared with the embodiment 5. The waveforms $V_0$ to $V_3$ which are used in this embodiment are shown in FIG. 25.

It is now assumed that the peak value of the second pulse among three pulses is $-V_a$. $|V_a|$ may be set to be larger than $|V_{sat}|$. When the peak value of the third pulse is expressed by adding a dash (') as compared with the peak value of the first pulse, the peak value of the third pulse determines the intermediate tone. The first pulse serves to correct the mean value of the impressed voltage to 0 and, for example, the equation $|V_b+V_{b'}|=|-V_a|$ is established.

Namely, a set of pulse voltages consist of three pulses and the last pulse among them decides the gray-scale level, while the previous pulse (i.e., the second pulse among the three pulses) determines a constant display state (dark state in this case). The further previous pulse (i.e., the first pulse) decides that the mean value of the applied voltage is 0. The waveforms of the voltages $V_0$ to $V_3$ are inputted to the driving circuit of FIG. 21. Due to this, the gray-scale display is attained and also the DC component of the voltage, which is a factor of deterioration, can be removed.

[EMBODIMENT 7]

This embodiment relates to a driving method in case of a gray-scale display and a matrix driving and in the case where the mean value of the voltage which is applied to the liquid crystal is not 0.

Figure 26:
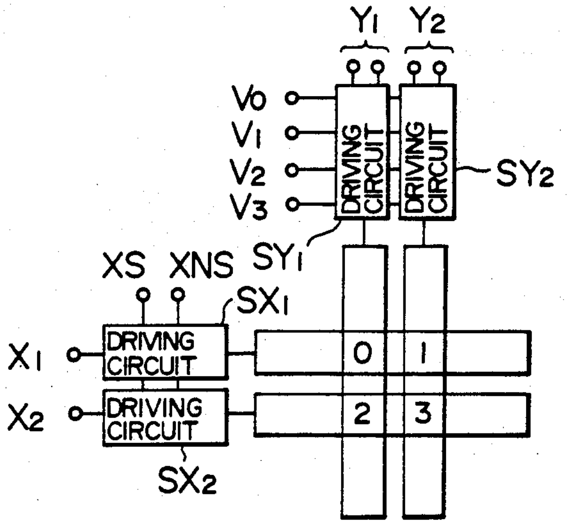

Even in this embodiment as well, as shown in FIG. 26, the case where the liquid crystal display panel in which liquid crystal display elements are arranged lika a matrix of 2×2 is driven will be explained as an example. Scanning driving circuits $SX_1$ and $SX_2$ are connected to the electrodes in the X direction and can apply the driving voltages XS and XNS to the electrodes by scanning signals $X_1$ and $X_2$, respectively. The circuit shown in FIG. 14 may be used as practical examples of the circuits $SX_1$ and $SX_2$.

On one hand, driving circuits $SY_1$ and $SY_2$ are connected to the electrodes in the Y direction and control the four driving voltages $V_0$ to $V_3$ by the input signals $Y_1$ and $Y_2$ and then apply to the electrodes. These circuits are also constituted by a combination of transfer gates similar to the circuits $SX_1$ and $SX_2$.

Figure 27:
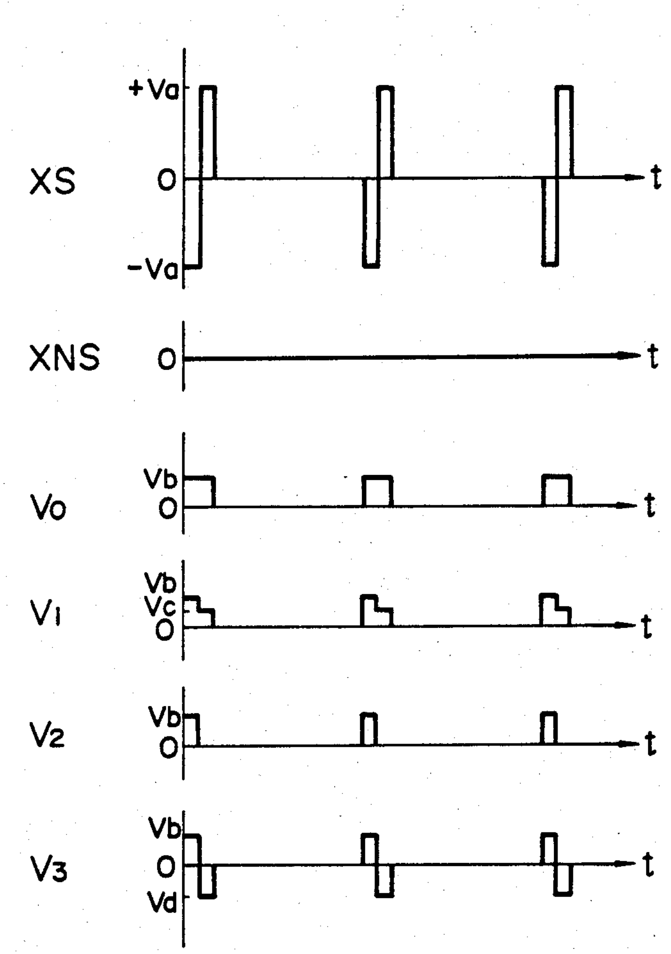

FIG. 27 shows driving voltage waveforms XS, XNS, $V_0$, $V_1$, $V_2$, and $V_3$. Namely, the waveform XS consists of two pulses of the peak value $\pm V_a$. The waveform XNS is a pulse waveform of 0. Each of the voltages $V_0$ to $V_3$ is the pulse waveform such that the former half has the peak value Vb and the latter half has the peak wave corresponding to the gray-scale.

Figure 28:
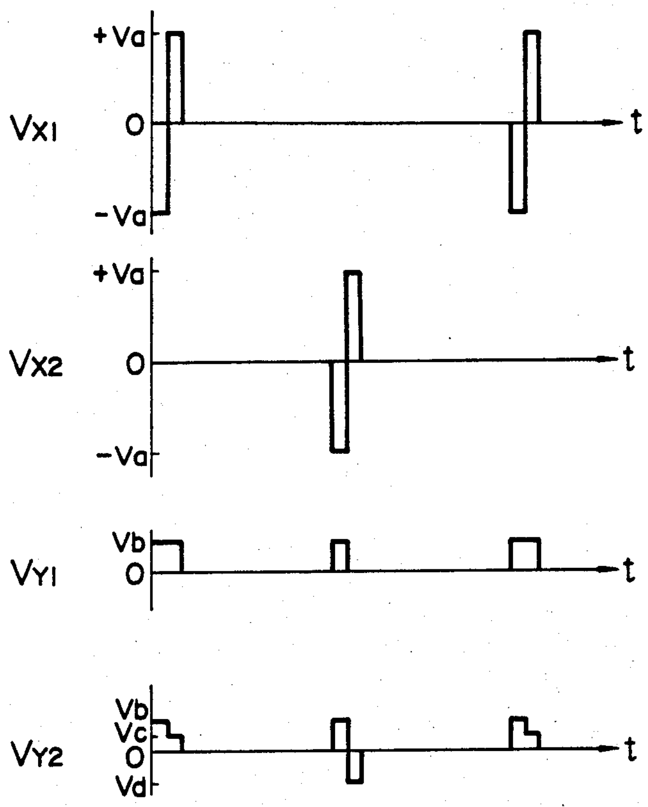
Figure 29:
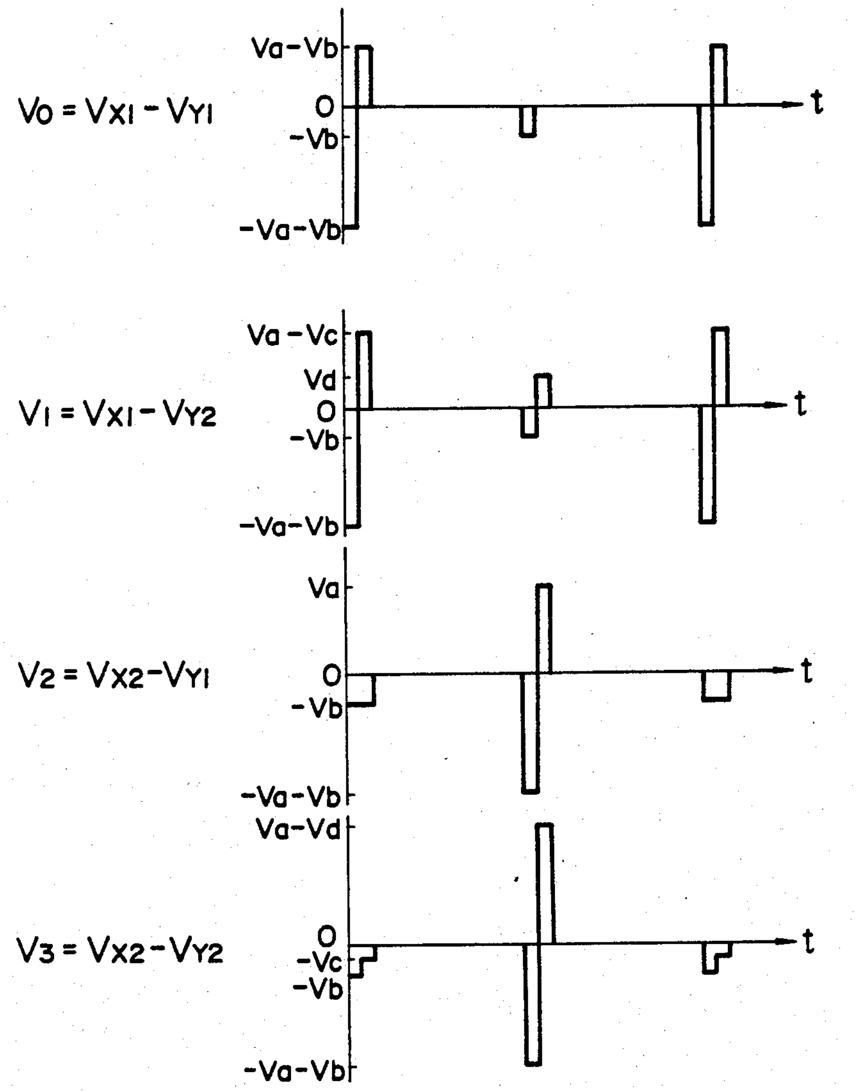

Next, FIG. 28 shows driving waveforms $V_{X1}$, $V_{X2}$, $V_{Y1}$, and $V_{Y2}$ to drive the respective electrodes when the brightnesses of four picture elements are 0 as shown in FIG. 26. In this case, the voltages which are applied to the respective picture elements become as shown in FIG. 29 since they are equal to the differences among the voltages which are applied to both electrodes.

It is important here that $|V_b|$, $|V_c|$ and $|V_d|$, namely, all of the peak values of the XNS do not exceed the threshold voltage $|V_{th}|$. In addition, it is desirable that $|-V_a-V_b|$ exceeds the saturation voltage $|V_{sat}|$. Due to this, when the pulse of the peak value $-V_a-V_b$ is applied, the display of the picture element is saturated into the dark state and a constant gray-scale is displayed by the next pulse. On the other hand, since any of the pulses which are applied for the time period when the picture elements on other scanning electrodes are being selected is below $|V_{th}|$, that is, since the voltage in the intensive zone, the display state does not change and a predetermined display can be performed.

According to this embodiment, the matrix driving having the gray-scale can be executed.

[EMBODIMENT 8]

In this embodiment, the mean value of the voltage which is applied to the liquid crystal is set to 0 as compared with the embodiment 7.

Figure 30:
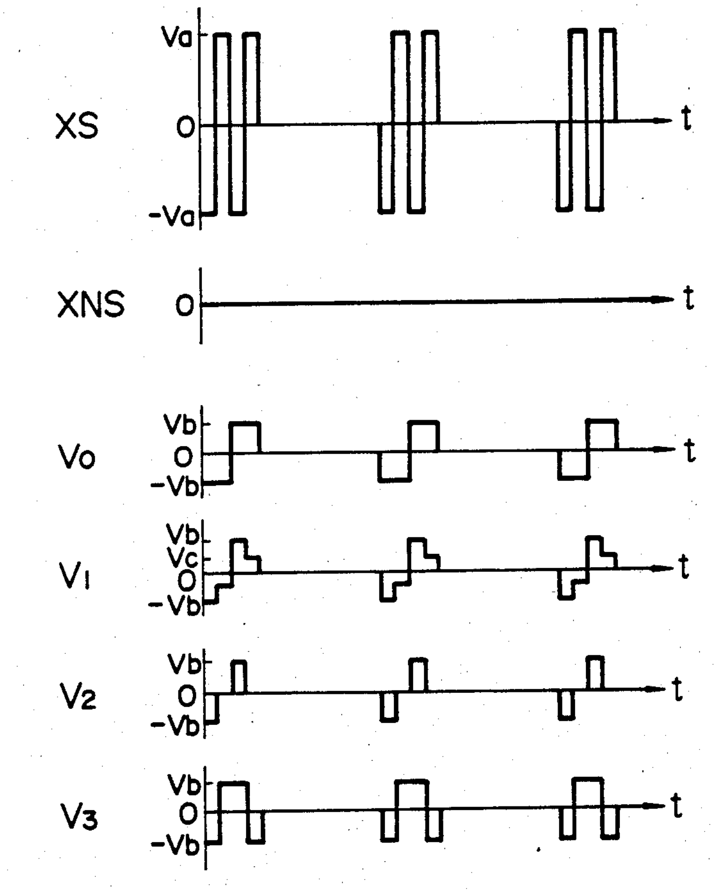

The driving voltage waveforms, XS, XNS, $V_0$, $V_1$, $V_2$, and $V_3$ in the embodiment 7 may be set as shown in FIG. 30. In the embodiment 8, it is important that the peak value of the waveform XNS does not exceed $|V_{th}|$. [EMBODIMENT 9]

Figure 31:
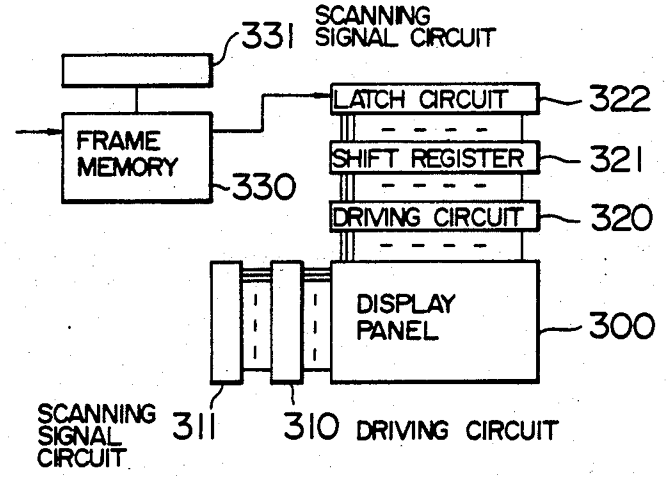
FIG. 31 is a circuit diagram useful for explaining an example of a display device in which a driving method according to the present invention is used.

An explanation will be made, as an example, with regard to an arrangement of a display apparatus using the liquid crystal display panel which is driven by way of the foregoing various kinds of driving method. FIG. 31 shows a matrix type liquid crystal display panel 300 using a high dielectric liquid crystal, driving circuits 310 and 320 to drive the electrode groups in the X and Y directions, and their peripheral circuits, etc.

The driving circuit 310 is connected to the electrodes in the X direction of the liquid crystal display panel and is line-sequentially scanned at a predetermined period by an output of a scanning signal circuit 311. The signal side driving circuit 320 which is connected to the electrodes in the Y direction receives a signal "0" or "1" corresponding to the display state (bright or dark state). These signals are given by a shift register 321 and a latch circuit 322. Characters, graphic patterns, and the like to be displayed are stored in a frame memory 330 and are outputted to the shift register 321 at a predetermined speed. After all signals corresponding to one scanning line were transferred to the shift register, the latch circuit 322 is made operative, so that the display data is stored therein and is also outputted to the driving circuit 320. It is apparent that these operations are performed synchronously with the circuits on the scanning side.

The display signal to be stored in the frame memory 330 may be a signal of an external apparatus, for instance, a keyboard or a computer, or television signals or the like. This display signal is stored in the frame memory while matching the timing by a timing control circuit 331. It is obvious that the timing control circuit controls the timings of all circuits.

As described above, according to the present invention, the driving method of the liquid crystal element having a memory property can be obtained.

We claim:

1. A method of driving a liquid crystal element with electrodes sandwiching a bistable ferroelectric liquid crystal therebetween, the ferroelectric liquid crystal having a hysteresis characteristic capable of taking at least two states of light transmission in one peak value voltage applied to said electrodes, comprising the steps of applying a first voltage signal the absolute value of a peak value of which is less than a predetermined value to said ferroelectric liquid crystal in order to keep a light transmission state of said liquid crystal element, and applying a second voltage signal the absolute value of a peak value of which is over said predetermined value to said ferroelectric liquid crystal in order to change the light transmission state of said liquid crystal element.

2. A method according to claim 1, wherein said second voltage signal is a voltage signal the absolute value of a peak value of which is over a saturation value at which the voltage dependence of the light transmission state of said liquid crystal element does not exist any longer.

3. A method according to claim 1, wherein the mean value of the voltage applied to said ferroelectric liquid crystal is substantially zero.

4. A method according to claim 1, wherein the period of time in which said first voltage signal is applied to said ferroelectric liquid crystal is longer than the period of time in which said second voltage signal is applied to said ferroelectric liquid crystal.

5. A method according to claim 1, wherein both of said first and second voltage signals are pulse voltage signals.

6. A method of driving a liquid crystal element with electrodes sandwiching a bistable ferroelectric liquid crystal therebetween, the ferroelectric liquid crystal having a hysteresis characteristic and capable of taking at least two states of light transmission in one peak value voltage applied to said electrodes, comprising the steps of:

applying a first voltage signal to said electrodes so as to cause the light transmission state of said ferroelectric liquid crystal to be in a predetermined initial state, said first voltage signal having a peak value whose absolute value is above a saturation value at which voltage dependence of the light transmission state of said liquid crystal element does not substantially exist, applying a desired second voltage signal to said electrodes so as to cause the light transmission state to be in a desired light transmission state, said second voltage signal having a peak value whose absolute value is above a predetermined value; and applying a third voltage signal to said electrodes to substantially maintain the desired light transmission state of said ferroelectric liquid crystal, said third voltage signal having a peak value whose absolute value is lower than said predetermined value.

7. A method according to claim 6, wherein said second voltage signal includes any voltage whose absolute value of the peak value thereof is lower than said saturation value.

8. A method according to claim 6, wherein the mean value of the voltage applied to said electrodes is substantially zero.

9. A method according to claim 6, wherein the period of time in which said third voltage signal is applied to said electrodes is longer than the periods of time in which said first voltage signal and said second voltage signal are applied to said electrodes, respectively.

10. A method according to claim 6, wherein said first voltage signal, said second voltage signal and said third voltage signal are all pulse voltage signals.

* * * * *